(12) United States Patent
Okuno et al.

(10) Patent No.: US 12,415,160 B2
(45) Date of Patent: Sep. 16, 2025

(54) CARBON DIOXIDE RECOVERY SYSTEM

(71) Applicant: IHI CORPORATION, Tokyo (JP)

(72) Inventors: Shinya Okuno, Tokyo (JP); Shiko Nakamura, Tokyo (JP); Hirohito Okuhara, Tokyo (JP); Miyuki Furusawa, Tokyo (JP)

(73) Assignee: IHI CORPORATION, Tokyo (JP)

( * ) Notice: Subject to any disclaimer, the term of this patent is extended or adjusted under 35 U.S.C. 154(b) by 618 days.

(21) Appl. No.: 17/959,387

(22) Filed: Oct. 4, 2022

(65) Prior Publication Data

US 2023/0027868 A1 Jan. 26, 2023

Related U.S. Application Data

(63) Continuation of application No. PCT/JP2021/022316, filed on Jun. 11, 2021.

(30) Foreign Application Priority Data

Aug. 31, 2020 (JP) ................. 2020-145496

(51) Int. Cl.
*B01D 53/96* (2006.01)
*B01D 53/14* (2006.01)
(Continued)

(52) U.S. Cl.
CPC ......... *B01D 53/96* (2013.01); *B01D 53/1412* (2013.01); *B01D 53/1475* (2013.01);
(Continued)

(58) Field of Classification Search
None
See application file for complete search history.

(56) References Cited

U.S. PATENT DOCUMENTS

2008/0159937 A1 7/2008 Ouimet
2011/0092355 A1* 4/2011 Iijima ................ B01D 53/1462
502/55

(Continued)

FOREIGN PATENT DOCUMENTS

JP 2010-514549 A 5/2010
JP 2011-177684 A 9/2011
(Continued)

*Primary Examiner* — Jelitza M Perez

(57) ABSTRACT

Provided is a carbon dioxide recovery system including: an absorption tower; a regeneration tower that takes in an absorbing solution that has absorbed carbon dioxide at the absorption tower, and separates the carbon dioxide from the absorbing solution using regenerated steam to regenerate the absorbing solution; first supply piping that supplies the absorbing solution regenerated in the regeneration tower to the absorption tower; a reclaimer that takes in part of the absorbing solution regenerated in the regeneration tower to remove degraded material and supplies the absorbing solution from which the degraded material has been removed to the regeneration tower or the first supply piping; an in-line viscometer that measures a viscosity of the absorbing solution flowing through the first supply piping; and a controller that controls an amount of the absorbing solution processed by the reclaimer based on the viscosity measured by the in-line viscometer.

6 Claims, 4 Drawing Sheets

(51) Int. Cl.
    *B01D 53/75*         (2006.01)
    *G01N 11/04*        (2006.01)
(52) U.S. Cl.
    CPC ............. *B01D 53/75* (2013.01); *G01N 11/04* (2013.01); *B01D 2257/504* (2013.01)

(56) References Cited

U.S. PATENT DOCUMENTS

| | | |
|---|---|---|
| 2014/0252700 A1 | 9/2014 | Sakaguchi et al. |
| 2020/0114302 A1 | 4/2020 | Miyamoto et al. |

FOREIGN PATENT DOCUMENTS

| | | |
|---|---|---|
| JP | 2013-099727 A | 5/2013 |
| JP | 2014-185913 A | 10/2014 |
| WO | 2013/073662 A1 | 5/2013 |
| WO | 2020/075544 A1 | 4/2020 |

\* cited by examiner

CARBON DIOXIDE RECOVERY SYSTEM

CROSS REFERENCE TO RELATED APPLICATIONS

This application is a continuation application of International Application No. PCT/JP2021/022316, filed on Jun. 11, 2021, which claims priority to Japanese Patent Application No. 2020-145496, filed on Aug. 31, 2020, the entire contents of which are incorporated by reference herein.

BACKGROUND

1. Technical Field

The present disclosure relates to a carbon dioxide recovery system.

2. Description of the Related Art

Carbon dioxide ($CO_2$) is contained in exhaust gases produced by burning fossil fuels in thermal power plants that use fossil fuels, for example. To reduce carbon dioxide emissions to the outside air, a system has been proposed to recover carbon dioxide from a carbon dioxide-containing gas, such as exhaust gases in thermal power plants.

Japanese Unexamined Patent Application Publication No. 2013-99727 (Patent Literature 1) discloses a technique regarding a carbon dioxide recovery system in which carbon dioxide is absorbed from a carbon dioxide-containing gas by bringing an absorbing solution that absorbs carbon dioxide into contact with the carbon dioxide-containing gas in an absorption tower. The absorbing solution is an aqueous solution of an amine compound. In this carbon dioxide recovery system, the absorbing solution that has absorbed carbon dioxide at the absorption tower is led to a regeneration tower, at which carbon dioxide is separated from the absorbing solution, and then the absorbing solution from which the carbon dioxide has been separated in the regeneration tower is returned to the absorption tower.

The absorbing solution circulating between the absorption tower and the regeneration tower as described above enters a state in which the amount of degraded material contained gradually increases as the recycle proceeds. The degraded material includes, for example, a heat stable salt (HSS). The accumulation of the heat stable salt leads to a decrease in the reactivity of the absorbing solution with carbon dioxide. Thus, the carbon dioxide recovery system disclosed in Patent Literature 1 includes a reclaimer that removes the heat stable salt from the absorbing solution using a distillation method based on the concentration of the heat stable salt contained in the absorbing solution measured using a pH meter, for example.

SUMMARY

With the reclaimer disclosed in Patent Literature 1, the concentration of the heat stable salt is specified based on the pH value, but the reclaimer cannot deal with a case where acid gases such as a nitrogen oxide ($NO_x$) and a sulfur oxide ($SO_x$) other than the heat stable salt are considered as degraded material. Meanwhile, if a carbon dioxide recovery system includes, for example, multiple analyzers that individually detect concentrations of these acid gases, this may lead to complexity in terms of configuration and control.

An object of the present disclosure is to provide a carbon dioxide recovery system that is advantageous in removing degraded material from an absorbing solution with a simple configuration or simple control.

A carbon dioxide recovery system according to one aspect of the present disclosure includes an absorption tower that causes an absorbing solution to absorb carbon dioxide contained in a carbon dioxide-containing gas, a regeneration tower that takes in the absorbing solution that has absorbed carbon dioxide at the absorption tower, and separates the carbon dioxide from the absorbing solution using regenerated steam to regenerate the absorbing solution, first supply piping that supplies the absorbing solution regenerated in the regeneration tower to the absorption tower, a reclaimer that takes in part of the absorbing solution regenerated in the regeneration tower to remove degraded material and supplies the absorbing solution from which the degraded material has been removed to the regeneration tower or the first supply piping, an in-line viscometer that measures a viscosity of the absorbing solution flowing through the first supply piping, and a controller that controls an amount of the absorbing solution processed by the reclaimer, based on the viscosity measured by the in-line viscometer.

In the carbon dioxide recovery system described above, the controller may change the amount of the absorbing solution processed by the reclaimer when the viscosity measured by the in-line viscometer exceeds a predetermined threshold. Specifically, the controller may start a process for the absorbing solution at the reclaimer when the viscosity measured by the in-line viscometer exceeds the threshold. Or, the controller may increase the amount of the absorbing solution processed by the reclaimer when the viscosity measured by the in-line viscometer exceeds the threshold. The above-described carbon dioxide recovery system may include second supply piping that supplies part of the absorbing solution regenerated in the regeneration tower to the reclaimer, and a first flow control valve arranged in the second supply piping, wherein the controller may change the amount of the absorbing solution processed by the reclaimer by making the first flow control valve adjust a flow of the absorbing solution. The above-described carbon dioxide recovery system may include third supply piping that is arranged in the first supply piping, takes in part of the absorbing solution circulating through the first supply piping, and returns the part of the absorbing solution to the first supply piping, a second flow control valve that is arranged upstream of the third supply piping, and a filter that is arranged downstream of the third supply piping, wherein the controller may increase an amount of the absorbing solution passing through the filter by making the second flow control valve adjust the flow of the absorbing solution when the viscosity measured by the in-line viscometer exceeds a predetermined threshold.

DESCRIPTION OF THE EMBODIMENTS

Some exemplary embodiments are described below with reference to the drawings. The dimensions, materials, specific numerical values, and the like illustrated in each embodiment are illustrative only and are not intended to limit the disclosure unless otherwise noted. Duplicate descriptions are omitted by assigning identical reference signs to elements having substantially identical functions and configurations, and illustrations are omitted for elements not directly related to the present disclosure.

Figure 1:
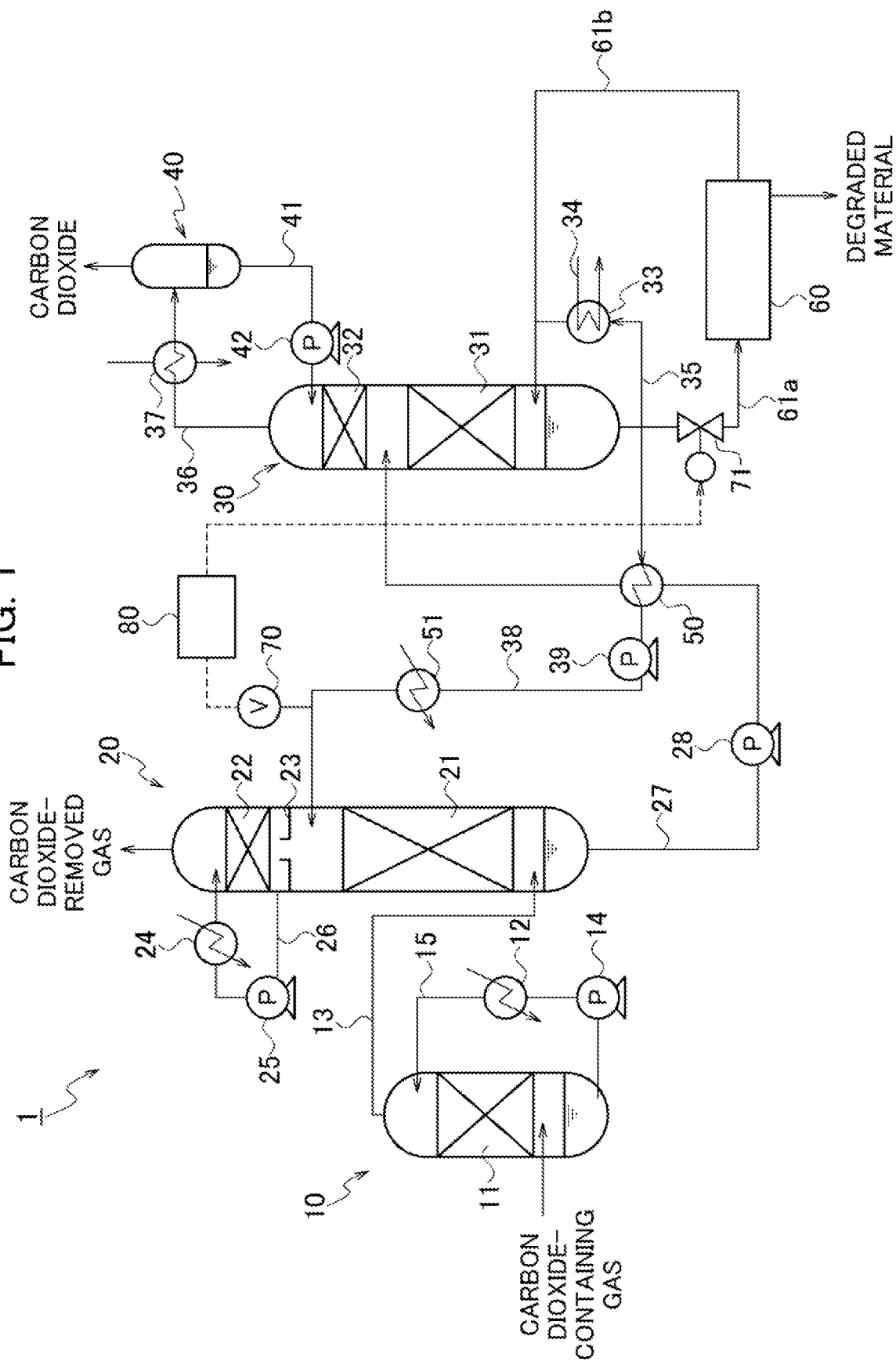
FIG. 1 is a diagram illustrating the configuration of a carbon dioxide recovery system according to one embodiment of the present disclosure.

FIG. 1 is a schematic diagram illustrating the configuration of a carbon dioxide recovery system 1 according to one embodiment. The carbon dioxide recovery system 1 is installed in thermal power plants and iron mills, which use a large amount of fossil fuel, for example, and recovers carbon dioxide from exhaust gases generated by burning fossil fuel. Hereinafter, a gas to be processed by the carbon dioxide recovery system 1, such as exhaust gases in thermal power plants, is referred to as a "carbon dioxide-containing gas". Note that the carbon dioxide-containing gas may be a natural gas, a process gas produced in chemical plants producing ammonia or the like, or a synthesis gas, such as a coal gasification gas.

The carbon dioxide recovery system 1 includes a pre-treatment tower 10, an absorption tower 20, a regeneration tower 30, a gas-liquid separator 40, a heat exchanger 50, a reclaimer 60, an in-line viscometer 70, a first flow control valve 71, and a controller 80.

The pre-treatment tower 10 cools a carbon dioxide-containing gas before being taken into the absorption tower 20. The carbon dioxide-containing gas taken into the pre-treatment tower 10 is cooled at a filling part 11 using cooling water cooled by a first cooler 12. The pre-treatment tower 10 includes first piping 13, at the top, that supplies the cooled carbon dioxide-containing gas to the absorption tower 20. The pre-treatment tower 10 includes first circulation piping 15 connecting the first cooler 12 and a first pump 14 to circulate cooling water. The cooling water stored at the bottom of the pre-treatment tower 10 is cooled by the first cooler 12 through the drive of the first pump 14 and is taken again into the pre-treatment tower 10.

The absorption tower 20 brings carbon dioxide contained in the carbon dioxide-containing gas into contact with an absorbing solution that absorbs carbon dioxide, and causes the absorbing solution to absorb the carbon dioxide contained in the carbon dioxide-containing gas. The absorbing solution is an aqueous solution of an amine compound. Examples of the amine compound used include basic amines such as monoethanolamines, diethanolamines, diisopropa-nolamines, methyldiethanolamines, and triethanolamines. When the carbon dioxide-containing gas contains an acid gas, such as $H_2S$, in addition to carbon dioxide, the acid gas is also absorbed by the absorbing solution. The absorption tower 20 includes a lower filling part 21, an upper filling part 22, and a water receiving part 23 arranged between the lower filling part 21 and the upper filling part 22. The first piping 13 extending from the pre-treatment tower 10 is connected to the absorption tower 20 at a part thereof below the lower filling part 21.

In the lower filling part 21, the carbon dioxide-containing gas, which is taken in through the first piping 13, is brought into countercurrent contact with the absorbing solution, the absorbing solution absorbs carbon dioxide in the carbon dioxide-containing gas, and thus carbon dioxide is removed from the carbon dioxide-containing gas. Hereinafter, the absorbing solution that has absorbed carbon dioxide at the absorption tower 20 is called a "rich solution".

The upper filling part 22 brings a carbon dioxide-removed gas after the contact with the absorbing solution at the lower filling part 21 into gas-liquid contact with a cleaning solution. The carbon dioxide-removed gas after the contact with the absorbing solution at the lower filling part 21 is accompanied by moisture and an amine compound evaporated at a high temperature due to an exothermic reaction resulting from the absorption of carbon dioxide. Thus, the upper filling part 22 brings the carbon dioxide-removed gas into gas-liquid contact with the cleaning solution to condense the moisture and the amine compound and makes the cleaning solution recover them. The carbon dioxide-removed gas after the cleaning is then discharged to the outside from the top of the absorption tower 20.

The water receiving part 23 temporarily stores the cleaning solution that has contained the moisture and the amine compound at the upper filling part 22. The water receiving part 23 has a configuration that allows gas to pass from below to above and does not allow liquid to pass from above to below. The absorption tower 20 includes second circulation piping 26 that connects a second cooler 24 and a second pump 25 to circulate the cleaning solution. The cleaning solution stored at the water receiving part 23 is cooled by the second cooler 24 and is taken again into the absorption tower 20 through the drive of the second pump 25.

The absorption tower 20 includes second piping 27, at the bottom, that supplies the rich solution to the regeneration tower 30. A third pump 28 that delivers the rich solution is connected to the second piping 27.

The regeneration tower 30 takes in the rich solution from the absorption tower 20 and separates carbon dioxide from the rich solution using regenerated steam to regenerate the absorbing solution. The regeneration tower 30 includes a lower filling part 31 and an upper filling part 32. The second piping 27 extending from the absorption tower 20 is connected to the regeneration tower 30 at a part thereof between the lower filling part 31 and the upper filling part 32.

In the lower filling part 31, the rich solution taken in from the second piping 27 is made to release carbon dioxide through an endothermic reaction. Here, the regeneration tower 30 includes a reboiler 33 and steam piping 34 that supplies the reboiler 33 with saturated steam for heating. The reboiler 33 heats the rich solution to make the rich solution release carbon dioxide. The regeneration tower 30 includes third circulation piping 35 that connects with the reboiler 33 and circulates the rich solution below the lower filling part 31. The rich solution once discharged from the regeneration tower 30 is led to the reboiler 33 through the third circulation piping 35 to be heated and then is taken again into the regeneration tower 30. Hereinafter, the absorbing solution from which carbon dioxide has been released in the regeneration tower 30 is called a "lean solution". The lean solution is stored at the bottom of the regeneration tower 30.

In the upper filling part 32, the carbon dioxide gas released from the rich solution is brought into gas-liquid contact with reflux water returned from the gas-liquid separator 40, which is described later, and thus the rich solution that still accompanies the carbon dioxide gas is removed. Note that a description of the specific configuration of the upper filling part 32 is omitted.

The regeneration tower 30 includes first discharge piping 36, at the top, that discharges carbon dioxide gas released from the rich solution. A third cooler 37 that condenses water vapor still accompanying the carbon dioxide gas is connected to the first discharge piping 36.

The gas-liquid separator 40 is connected to an outlet side opening of the first discharge piping 36 and separates the condensed water generated through cooling in the third cooler 37 from the carbon dioxide gas. The carbon dioxide gas separated by the gas-liquid separator 40 is discharged out of the system from the top of the gas-liquid separator 40 and is finally recovered. Meanwhile, the gas-liquid separator 40 includes fourth circulation piping 41 that supplies the separated condensed water as reflux water to an upper part of the upper filling part 32 in the regeneration tower 30. A fourth pump 42 that delivers the reflux water is connected to the fourth circulation piping 41.

The regeneration tower 30 includes third piping 38, at the bottom, that supplies the lean solution to the absorption tower 20. A fifth pump 39 that delivers the lean solution is connected to the third piping 38. An outlet side opening of the third piping 38 is connected to the absorption tower 20 at a position above the lower filling part 21 and below the upper filling part 22. The third piping 38 is connected with a heat exchanger 50 that performs heat exchange with the rich solution flowing through the second piping 27, and is connected with a fourth cooler 51 that is arranged downstream of the heat exchanger 50 and cools the lean solution.

The heat exchanger 50 cools the lean solution through performing heat exchange with the rich solution. The lean solution that has passed through the heat exchanger 50 is further cooled by the fourth cooler 51 downstream and then is supplied to the absorption tower 20. That is, it is possible to adjust the temperature of the lean solution supplied to the absorption tower 20 by appropriately changing operating settings in the heat exchanger 50 and the fourth cooler 51. As described above, in the carbon dioxide recovery system 1, the absorbing solution is recycled in such a manner as to absorb carbon dioxide in the absorption tower 20, release carbon dioxide in the regeneration tower 30, and then absorb carbon dioxide again in the absorption tower 20.

The reclaimer 60 takes in part of the absorbing solution (lean solution) from the regeneration tower 30 to remove degraded material contained in the absorbing solution. In the present embodiment, the absorbing solution regenerated by the reclaimer 60 is supplied to the regeneration tower 30. Here, the reclaimer 60 includes inlet piping 61a that takes in the absorbing solution from the regeneration tower 30 and outlet piping 61b that guides the regenerated absorbing solution out to the regeneration tower 30. The degraded material assumed in the present embodiment is a heat stable salt, or an acid gas, such as a nitrogen oxide and a sulfur oxide. Degraded material removal methods that the reclaimer 60 may employ include distillation, ion exchange, and electrodialysis. For example, when the reclaimer 60 employs a distillation method, the heat stable salt is first separated into an amine compound and a neutralizing salt through the addition of a neutralizing agent. The absorbing solution is then evaporated through heating using steam and is returned to the regeneration tower 30, while the degraded material is discharged to the outside. Note that it is desirable from a viewpoint of effective use of heat that the absorbing solution regenerated by the reclaimer 60 be returned to the regeneration tower 30. Meanwhile, the absorbing solution regenerated in the reclaimer 60 may be returned to the third piping 38, for example.

The in-line viscometer 70 measures the viscosity of the lean solution flowing through the third piping 38. The in-line viscometer 70 may be arranged at any position of the third piping 38. However, since the temperature of the lean solution is relatively low and the response becomes faster due to flooding concerns in the absorption tower 20, for example, it is desirable that the in-line viscometer 70 be arranged in the vicinity of where the third piping 38 is connected with the absorption tower 20. Here, the flooding is a phenomenon in which the viscosity of the absorbing solution increases in the absorption tower 20, resulting in excessive pressure loss in the absorption tower 20 and inoperability. The in-line viscometer 70 is electrically connected to the controller 80. The measurement result from the in-line viscometer 70 is transmitted to the controller 80.

The first flow control valve 71 is arranged in the inlet piping 61a that takes the absorbing solution into the reclaimer 60, and is a solenoid valve that controls the flow of the absorbing solution flowing in the inlet piping 61a. In the present embodiment, the first flow control valve 71 corresponds to an apparatus or mechanism that changes the amount of the absorbing solution processed by the reclaimer 60. The first flow control valve 71 is electrically connected to the controller 80. The degree of opening of the first flow control valve 71 is changed according to a control signal from the controller 80.

The controller 80 controls the operation of the whole carbon dioxide recovery system 1. In the present embodiment, it is possible for the controller 80 to control the amount of the absorbing solution processed by the reclaimer 60, based on the viscosity of the lean solution measured by the in-line viscometer 70.

Next, the action of the carbon dioxide recovery system 1 is explained.

In the carbon dioxide recovery system 1, the basic operation of removing and recovering carbon dioxide from the carbon dioxide-containing gas taken into the pre-treatment tower 10 is as described together with the explanation of each component above. During this basic operation, the absorbing solution circulating between the absorption tower 20 and the regeneration tower 30 enters a state in which the amount of degraded material contained has gradually increased, and the carbon dioxide recovery system 1 removes the degraded material contained in the absorbing solution using the reclaimer 60. Here, as the recycling of the absorbing solution proceeds, various types of degraded material are produced in the absorbing solution, and consequently, the viscosity of the absorbing solution increases.

Figure 2:
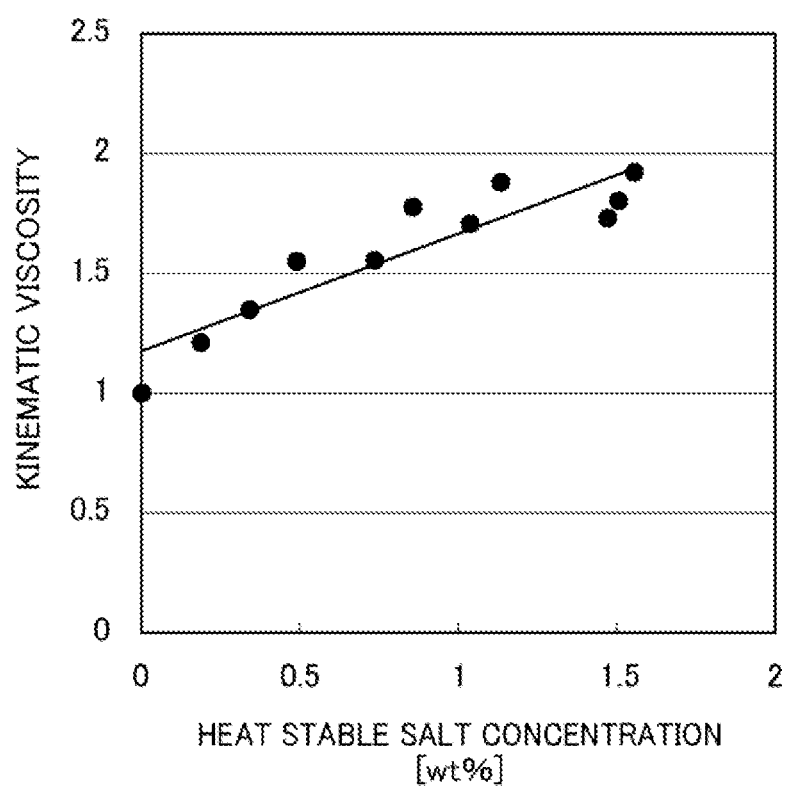
FIG. 2 is a graph illustrating a relationship between the concentration of a heat stable salt in an absorbing solution and the kinematic viscosity of the absorbing solution.

FIG. 2 is a graph illustrating a relationship between the concentration of a heat stable salt in an absorbing solution and the kinematic viscosity, as an example. The plot points in the figure indicate the kinematic viscosity specified for each value of the heat stable salt concentration (wt %). Note that the kinematic viscosity indicated is constituted by relative values based on the kinematic viscosity being 1 in the case where the temperature is 50 (° C.) and the concentration of the heat stable salt is 0 (wt %). With reference to these values, the relationship between the concentration of the heat stable salt and the kinematic viscosity is expressed by a linear approximation as in the figure. Thus, the higher the concentration of the heat stable salt, the higher the kinematic viscosity. This tendency is similar when a different absorbing solution is used than the one for which the result in FIG. 2 is obtained. In FIG. 2, only the heat stable salt is focused on as the degraded material, but when acid gases, such as a nitrogen oxide and a sulfur oxide, are contained as degraded material, similar tendency is observed as in FIG. 2.

Thus, in the present embodiment, the amount of the absorbing solution processed in the reclaimer 60 is determined based on the viscosity of the absorbing solution measured by the in-line viscometer 70 as described below.

Figure 3:
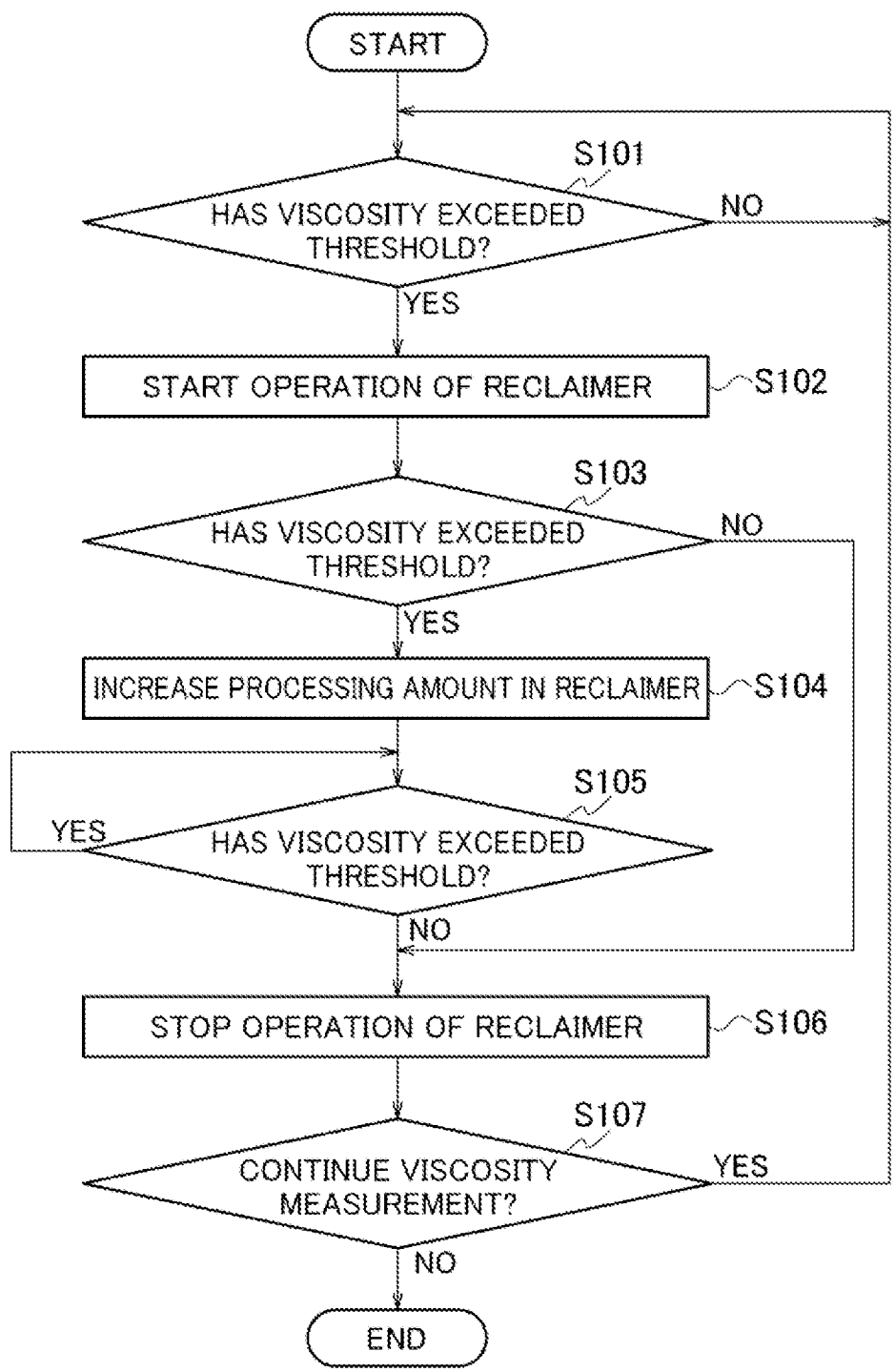
FIG. 3 is a flow chart illustrating an operation flow of a reclaimer in a first embodiment.

FIG. 3 is a flow chart illustrating the operation flow of the reclaimer 60. Note that it is assumed that the basic operation of the carbon dioxide recovery system 1 has already started. It is also assumed that the reclaimer 60 is ready to start a process of removing degraded material in accordance with the start of the basic operation of the carbon dioxide recovery system 1. Specifically, when the reclaimer 60 employs, for example, a distillation method, a heat source included in the reclaimer 60 is already in operation. Meanwhile, the first flow control valve 71 is "closed" at this stage, and the absorbing solution has not been taken into the reclaimer 60. That is, at this stage, the reclaimer 60 has not started the process of removing degraded material.

First, the controller 80 receives measurement results in a continuous manner from the in-line viscometer 70 in accordance with the basic operation of the carbon dioxide recovery system 1. Then, based on the measurement results obtained from the in-line viscometer 70, the controller 80 determines the viscosity of the absorbing solution (specifically, the lean solution) and determines whether the viscosity has exceeded a threshold (step S101). Here, the threshold of viscosity may be derived from a control value of the total amount of the heat stable salt with reference to, for example, previously obtained measurement values as in FIG. 2. It is possible to adopt various control values considering the type of amine compound, materials of component parts and specifications of apparatuses in the carbon dioxide recovery system 1, and the like, but the control value may be set in a range of 0.5 to 2.0 wt %, for example.

While the controller 80 determines that the viscosity does not exceed the threshold in step S101 (NO), it repeats the above determination again.

In contrast, when determining that the viscosity exceeds the threshold in step S101 (YES), the controller 80 then starts the operation of the reclaimer 60 (step S102). The operation of the reclaimer 60 here is an operation in which the reclaimer 60 actually performs the process of removing degraded material from the absorbing solution. Thus, in step S102, specifically, the controller 80 makes the first flow control valve 71 "open" to some degree to take the absorbing solution into the reclaimer 60 and makes the reclaimer 60, whose heat source is already in operation, perform the process of removing degraded material. For example, when employing a distillation method, the reclaimer 60 continuously performs the process of removing degraded material until the operation is stopped in the subsequent step S106. Here, a typical reclaimer employing the distillation method processes about 1 to 3% of the amount of a circulated solution. In contrast, in the present embodiment, the amount processed by the reclaimer 60 at the present stage may be set to even less than 1 to 3% of the amount of a circulated solution.

Next, based on the measurement result obtained from the in-line viscometer 70, the controller 80 determines whether the viscosity of the absorbing solution has exceeded a threshold (step S103). The threshold here is the same as that used for the determination in step S101.

Since the reclaimer 60 has already started the process of removing degraded material, the viscosity of the circulated absorbing solution should fall below the threshold in due course if the amount of degraded material has been reduced from the whole absorbing solution. Thus, when determining in step S103 that the viscosity does not exceed the threshold (NO), the controller 80 stops the operation of the reclaimer 60 (step S106).

In contrast, when determining that the viscosity exceeds the threshold in step S103 (YES), the controller 80 then increases the amount of processing for removing the degraded material in the reclaimer 60 (step S104). At this time, the controller 80 may increase the amount of processing in the reclaimer 60 by making the first flow control valve 71 open more than the degree of opening in step S102 to increase the amount of the absorbing solution supplied to the reclaimer 60. As a guideline for the amount of processing at this stage, for example, if the amount of processing is set to be even less than 1 to 3% of the amount of the circulated solution in step S102, the amount of processing may be set to be 1 to 3% of the amount of the circulated solution in step S104. Furthermore, in step S104, the controller 80 may increase the amount of processing by adjusting operating settings of the heat source included in the reclaimer 60, such as increasing the amount of steam generation, in an appropriate manner.

Next, based on a measurement result obtained from the in-line viscometer 70, the controller 80 determines whether the viscosity of the absorbing solution has exceeded a threshold (step S105). The threshold here is also the same as that used for the determination in step S101.

Here, the amount of processing for removing degraded material in the reclaimer 60 is increased, and thus if the amount of the degraded material is reduced from the whole circulated absorbing solution, the viscosity of the absorbing solution should fall below the threshold in due course. Thus, when determining in step S105 that the viscosity does not exceed the threshold (NO), the controller 80 stops the operation of the reclaimer 60 (step S106).

In contrast, when determining that the viscosity exceeds the threshold in step S105 (YES), the controller 80 continues making the reclaimer 60 remove degraded material while maintaining the amount of processing set in step S104.

In step S106, specifically, it is possible for the controller 80 to stop the operation of the reclaimer 60 by making the first flow control valve 71 "closed."

After step S106, the controller 80 determines whether to continue the measurement of the viscosity of the absorbing solution by the in-line viscometer 70 (step S107), and when the controller 80 determines to continue (YES), the process returns to step S101. In contrast, when determining in step S107 not to continue the viscosity measurement (NO), the controller 80 ends the viscosity measurement and ends the process of removing degraded material performed by the reclaimer 60.

Next, effects of the carbon dioxide recovery system 1 are described.

The carbon dioxide recovery system 1 according to the present embodiment includes the absorption tower 20 that causes an absorbing solution to absorb carbon dioxide contained in a carbon dioxide-containing gas. The carbon dioxide recovery system 1 includes the regeneration tower 30 that takes in the absorbing solution that has absorbed carbon dioxide at the absorption tower 20, and separates the carbon dioxide from the absorbing solution using regenerated steam to regenerate the absorbing solution. The carbon dioxide recovery system 1 includes first supply piping that supplies the absorbing solution regenerated in the regeneration tower 30 to the absorption tower 20, and the reclaimer 60 that takes in part of the absorbing solution regenerated in the regeneration tower 30 to remove degraded material therefrom and supplies the absorbing solution from which the degraded material is removed to the regeneration tower 30 or the first supply piping. The carbon dioxide recovery system 1 includes the in-line viscometer 70 that measures the viscosity of the absorbing solution flowing through the first supply piping, and the controller 80 that controls the amount of the absorbing solution processed in the reclaimer 60, based on the viscosity measured by the in-line viscometer 70.

Here, the first supply piping corresponds to the third piping 38 included in the configuration of the carbon dioxide recovery system 1 exemplified above.

In the carbon dioxide recovery system 1, it is possible to remove degraded material contained in the absorbing solution using the reclaimer 60. Here, the controller 80 controls the amount of the absorbing solution processed by the reclaimer 60, based on the viscosity of the absorbing solution measured by the in-line viscometer 70, and thus the target of degraded material removal is not limited to a heat stable salt. Specifically, for example, when the concentration of the heat stable salt in the absorbing solution is specified in some way in another carbon dioxide recovery system and the degree of degraded material removal is determined based on the concentration, the target of degraded material removal is limited to the heat stable salt. That is, when the concentration of the heat stable salt in the absorbing solution is within an acceptable range and the concentration of acid gases, such as a nitrogen oxide and a sulfur oxide, other than the heat stable salt in the absorbing solution increases, these acid gases are not determined as the degraded material and remain in the absorbing solution. In contrast, in the carbon dioxide recovery system 1 according to the present embodiment, when the concentration of an acid gas in the absorbing solution increases, it is recognized as an increase in the viscosity of the absorbing solution, and thus it is possible to remove the acid gas as the degraded material.

In the carbon dioxide recovery system 1, the controller 80 refers only to the measurement result from the in-line viscometer 70 to control the amount of the absorbing solution processed by the reclaimer 60. That is, the carbon dioxide recovery system 1 does not need to include multiple analyzers and the like to individually detect the concentrations of acid gases in the absorbing solution, and thus it does not cause complications in configuration and control.

As described above, according to the present embodiment, it is possible to provide the carbon dioxide recovery system 1, which is advantageous for removing degraded material from an absorbing solution with a simple configuration and simple control.

As described above, there is a concern that flooding may occur when the viscosity of the absorbing solution increases in the absorption tower 20. However, in the carbon dioxide recovery system 1, the controller 80 is capable of directly acquiring the viscosity data over time from the in-line viscometer 70, and thus it is possible to reduce the risk of flooding by constantly monitoring the viscosity values.

In the carbon dioxide recovery system 1, the controller 80 may change the amount of the absorbing solution processed by the reclaimer 60 when the viscosity measured by the in-line viscometer 70 exceeds a predetermined threshold.

In the above-described carbon dioxide recovery system 1, the controller 80 determines whether or not to change the amount of the absorbing solution processed in the reclaimer 60 based on whether or not the viscosity measured by the in-line viscometer 70 exceeds a threshold, and thus the control is more simplified. It is possible for the controller 80 to immediately change the amount of the absorbing solution processed by the reclaimer 60 when the viscosity measured by the in-line viscometer 70 exceeds the threshold, thus achieving highly reactive control.

In the carbon dioxide recovery system 1, the controller 80 may start the process of the absorbing solution in the reclaimer 60 when the viscosity measured by the in-line viscometer 70 exceeds the threshold.

Conventionally, a reclaimer that employs, for example, a distillation method continuously removes degraded material while the basic operation of the carbon dioxide recovery system is being performed. In contrast, in the carbon dioxide recovery system 1 according to the present embodiment, it is possible to reduce the energy required for the operation of the reclaimer 60 because the reclaimer 60 does not perform the process of removing degraded material when the viscosity of the absorbing solution does not exceed the threshold. Since the energy required for the operation of the reclaimer 60 is reduced, it is possible to simplify and miniaturize the structure of the reclaimer 60, and consequently, the equipment cost is expected to be reduced by optimizing the apparatus size.

In the carbon dioxide recovery system 1, the controller 80 may increase the amount of the absorbing solution processed by the reclaimer 60 when the viscosity measured by the in-line viscometer 70 exceeds the threshold.

Conventionally, as described above, the amount of solution normally processed by a reclaimer using the distillation method is about 1 to 3% of the amount of a circulated solution. This conventional normal processed amount tends to be unnecessarily excessive when the absorbing solution does not contain a significant amount of degraded material. In contrast, in the carbon dioxide recovery system 1 according to the present embodiment, the reclaimer 60 increases the amount of the absorbing solution processed when the viscosity of the absorbing solution exceeds the threshold, and thus it is possible to suppress the initial amount of processing. That is, for example, when the viscosity of the absorbing solution does not exceed the threshold, it is possible to set the amount of processing to be less than 1 to 3% of the amount of the circulated solution, and when the viscosity of the absorbing solution exceeds the threshold, it is possible to set the amount of processing to be 1 to 3% of the amount of the circulated solution. Thus, in the above-described carbon dioxide recovery system 1, it is also possible to reduce the energy required to operate the reclaimer 60.

The carbon dioxide recovery system 1 may include second supply piping that supplies part of the absorbing solution regenerated by the regeneration tower 30 to the reclaimer 60, and the first flow control valve 71 arranged in the second supply piping. Here, the controller 80 may change the amount of the absorbing solution processed by the reclaimer 60 by making the first flow control valve 71 adjust the flow of the absorbing solution.

Here, the second supply piping corresponds to the inlet piping 61a included in the configuration of the carbon dioxide recovery system 1 exemplified above.

In the above-described carbon dioxide recovery system 1, it is possible to change the amount of the absorbing solution processed by the reclaimer 60 only by the operation of the first flow control valve 71, thereby achieving a simpler configuration or simpler control.

Figure 4:
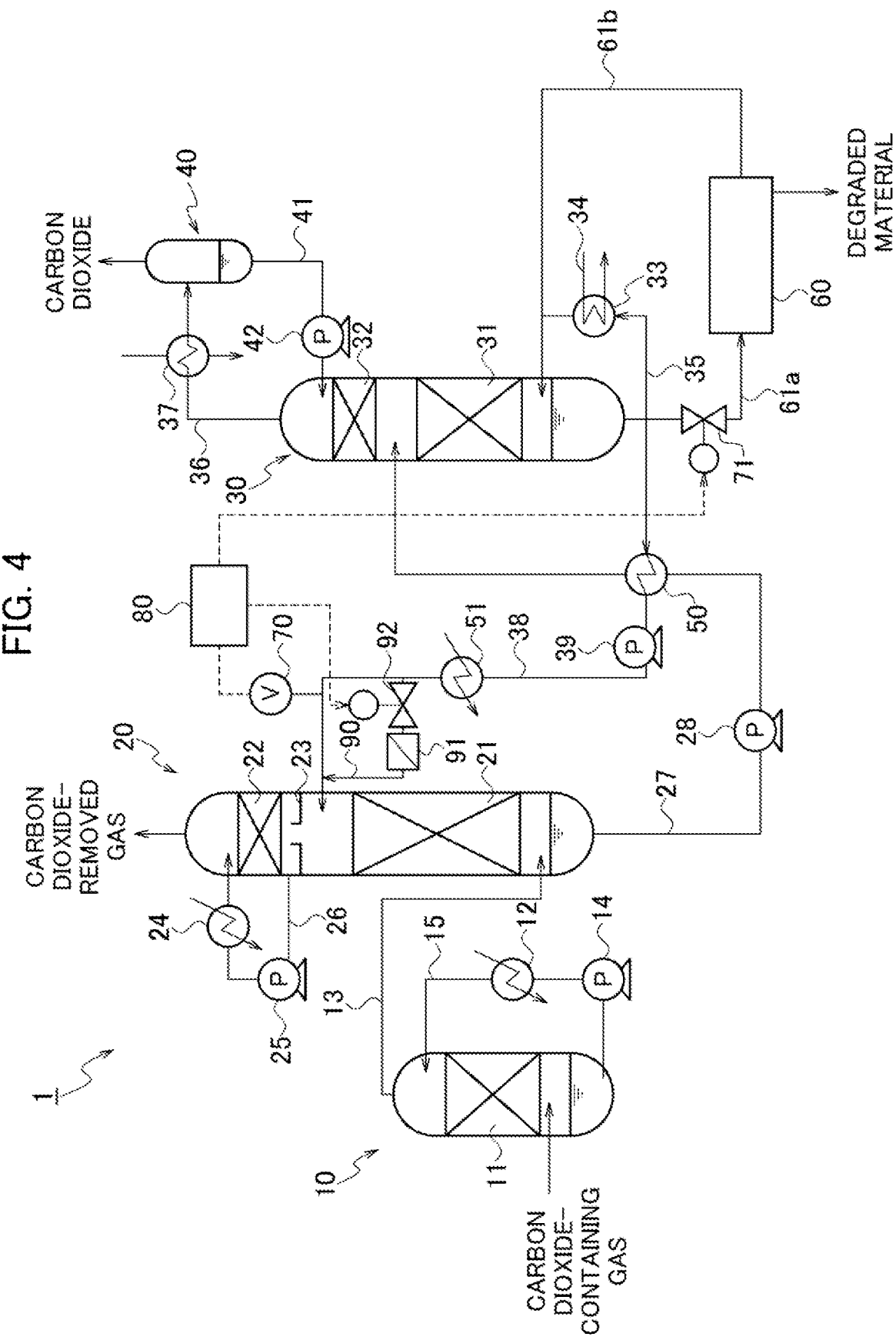
FIG. 4 is a diagram illustrating the configuration of a carbon dioxide recovery system according to another embodiment of the present disclosure.

FIG. 4 is a schematic diagram illustrating the configuration of the carbon dioxide recovery system 1 according to another embodiment. The basic configuration of the carbon dioxide recovery system 1 in FIG. 4 is the same as that of the carbon dioxide recovery system 1 in FIG. 1, and thus the same reference signs are used and the detailed explanation is omitted.

The carbon dioxide recovery system 1 in FIG. 4 further includes detour piping 90 as third supply piping. The detour piping 90 is arranged in the third piping 38, which is the first supply piping, takes in part of the absorbing solution circulating through the first supply piping, and returns the part of the absorbing solution to the first supply piping. The carbon dioxide recovery system 1 in FIG. 4 also includes a filter 91 arranged downstream of the third supply piping, and a second flow control valve 92 arranged upstream of the third supply piping. Here, when the viscosity measured by the in-line viscometer 70 exceeds a predetermined threshold, the controller 80 may increase the amount of the absorbing solution passing through the filter 91 by making the second flow control valve 92 adjust the flow of the absorbing solution.

The filter 91 removes solids, oils, or the like, contained in the absorbing solution (specifically, the lean solution). The filter 91 may be of any type and be made from any material.

In addition to an increase in the viscosity of the absorbing solution, for example, an increase in the solids or oils contained in the absorbing solution may cause the absorbing solution to be more likely to foam, which may cause flooding in the absorption tower 20. In the carbon dioxide recovery system 1 in FIG. 4, it is possible for the controller 80 to increase the amount of the absorbing solution passing through the filter 91 when the measurement result from the in-line viscometer 70 is a viscosity value at which the absorbing solution is likely to foam. It is thus possible for the filter 91 to remove solids, oils, or the like from the absorbing solution to reduce the possibility of foaming in advance.

Although several embodiments have been described herein, it is to be understood that other variations and modifications of the embodiments are possible in light of the teachings of the present disclosure. The features of all embodiments and all claims can be combined with each other as long as they do not contradict each other.

What is claimed is:

1. A carbon dioxide recovery system, comprising:
   an absorption tower that causes an absorbing solution to absorb carbon dioxide contained in a carbon dioxide-containing gas;
   a regeneration tower that takes in the absorbing solution that has absorbed carbon dioxide at the absorption tower, and separates the carbon dioxide from the absorbing solution using regenerated steam to regenerate the absorbing solution;
   first supply piping that supplies the absorbing solution regenerated in the regeneration tower to the absorption tower;
   a reclaimer that takes in part of the absorbing solution regenerated in the regeneration tower to remove degraded material and supplies the absorbing solution from which the degraded material has been removed to the regeneration tower or the first supply piping;
   an in-line viscometer that measures a viscosity of the absorbing solution flowing through the first supply piping; and
   a controller that controls an amount of the absorbing solution processed by the reclaimer, based on the viscosity measured by the in-line viscometer.

2. The carbon dioxide recovery system according to claim 1, wherein
   the controller changes the amount of the absorbing solution processed by the reclaimer when the viscosity measured by the in-line viscometer exceeds a predetermined threshold.

3. The carbon dioxide recovery system according to claim 2, wherein
   the controller starts a process for the absorbing solution at the reclaimer when the viscosity measured by the in-line viscometer exceeds the threshold.

4. The carbon dioxide recovery system according to claim 2, wherein
   the controller increases the amount of the absorbing solution processed by the reclaimer when the viscosity measured by the in-line viscometer exceeds the threshold.

5. The carbon dioxide recovery system according to claim 1, further comprising:
   second supply piping that supplies part of the absorbing solution regenerated in the regeneration tower to the reclaimer; and
   a first flow control valve arranged in the second supply piping, wherein
   the controller changes the amount of the absorbing solution processed by the reclaimer by making the first flow control valve adjust a flow of the absorbing solution.

6. The carbon dioxide recovery system according to claim 1, further comprising:
   third supply piping that is arranged in the first supply piping, takes in part of the absorbing solution circulating through the first supply piping, and returns the part of the absorbing solution to the first supply piping;
   a second flow control valve that is arranged upstream of the third supply piping; and
   a filter that is arranged downstream of the third supply piping, wherein
   the controller increases an amount of the absorbing solution passing through the filter by making the second flow control valve adjust the flow of the absorbing solution when the viscosity measured by the in-line viscometer exceeds a predetermined threshold.

* * * * *